No. 770,091. PATENTED SEPT. 13, 1904.
A. S. McALLISTER.
ALTERNATING CURRENT MACHINERY.
APPLICATION FILED FEB. 15, 1904.
NO MODEL.
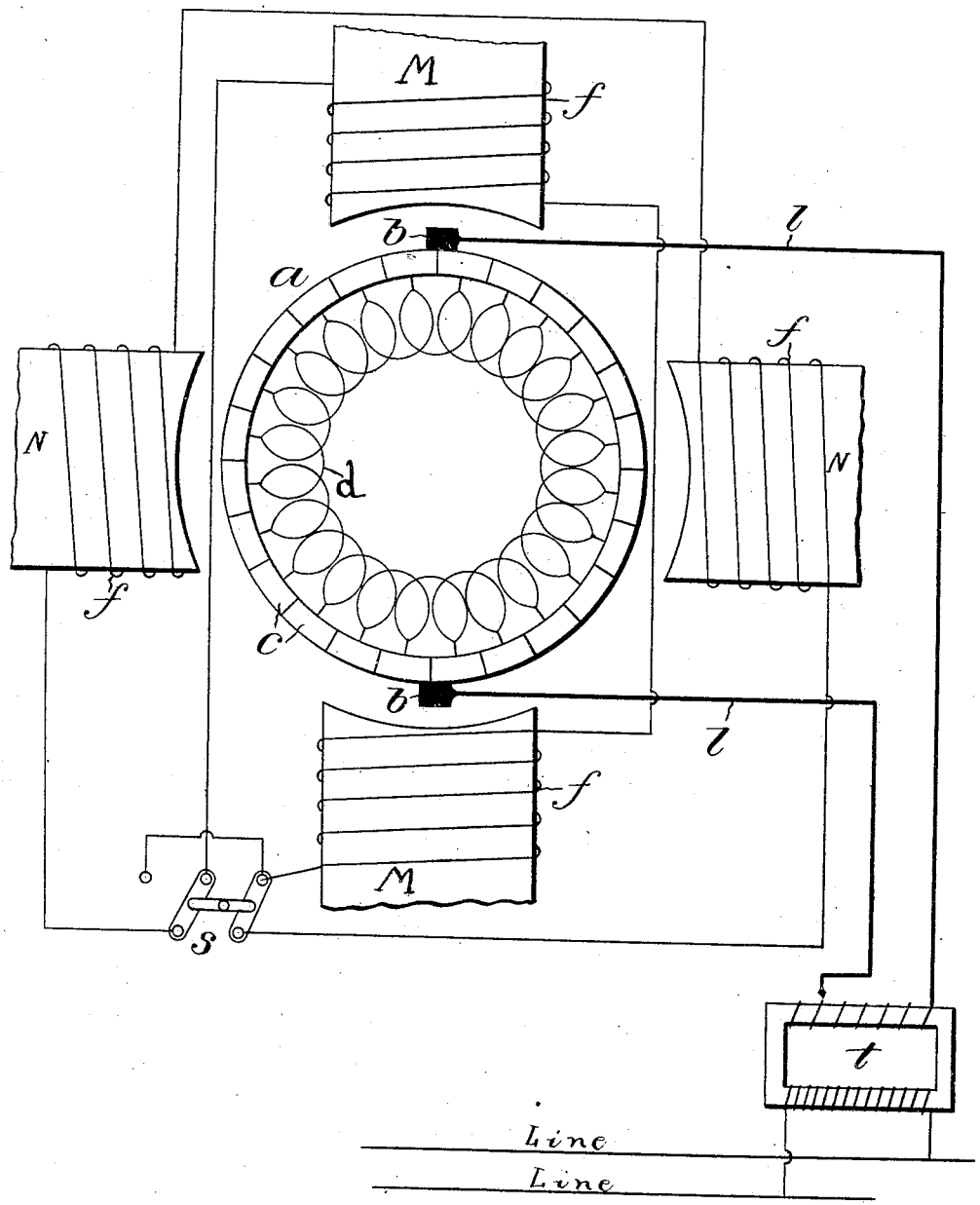
Witnesses
C. H. Walker,
F. W. Moore,
Inventor
Addams Stratton McAllister
By
James Hamilton
Attorney No. 770,091.

Patented September 13, 1904.

UNITED STATES PATENT OFFICE.

ADDAMS S. McALLISTER, OF ITHACA, NEW YORK.

ALTERNATING-CURRENT MACHINERY.

SPECIFICATION forming part of Letters Patent No. 770,091, dated September 13, 1904.

Application filed February 15, 1904. Serial No. 193,709. (No model.)

*To all whom it may concern:*

Be it known that I, ADDAMS STRATTON MC-ALLISTER, a citizen of the United States, and a resident of Ithaca, in the county of Tompkins and State of New York, have invented certain new and useful Improvements in Alternating-Current Machinery, of which the following is a specification, reference being had to the accompanying drawings, forming part of the same.

My invention relates to improvements in single-phase alternating-current machinery; and the object of my invention is to provide a variable-speed single-phase alternating-current motor having the mechanical characteristics of the direct-current series motor capable of overcoming in its operation the difficulties encountered with other variable-speed alternating-current motors and susceptible of use at will as either a motor or a generator.

In the drawing, the figure shows in diagrammatic elevation my new motor.

The rotary armature or rotor $a$ is provided with a commutator $c$, to which the single-phase alternating current is fed by the brushes $b$, connected by the lead-wires $l$ to any suitable source of such a current. The field-magnets are provided with field-coils $f$, which through and by means of the double-throw switch $s$ form a circuit locally closed upon itself and not in electrical connection with any extraneous supply-circuit. While the drawing shows four projecting field-core sections, the machine as illustrated is of the bipolar type, the coils on the core-sections in mechanical quadrature to the axial line of the brushes being supplied with current from the coils on the other two cores.

The current which enters the armature-winding $d$ through the brushes $b$ and commutator $c$ and flows therethrough causes the formation on the armature-core of magnetic poles having the mechanical direction of the axial line joining the brushes, and these magnetic poles alternating, as they do, with the rise and fall of the current and the change in its direction generate an electromotive force in the field-coils $f$. Due to this electromotive force current flows through the locally-closed circuits around all four of the projecting sections of the field-cores and produces magnetic poles in the stationary field-cores. When the rotor is stationary, the armature-winding forms what is practically the primary of a static transformer. The axial brush-line field-winding forms the secondary of this transformer, while the coil on the quadrature field-core is an impedance load-circuit for the secondary of the transformer. Consider now the load-circuit surrounding the quadrature field-core. Since to this winding there is no opposing secondary circuit, the magnetism in the core will be practically in time phase with the current producing it. This current is the secondary load-current of the transformer. As is true in any transformer, there will flow in the primary coil a current in phase opposition to the secondary current in addition to and superposed upon the primary no-load exciting-current. It is thus seen that the load-current in the primary (or armature) coil will be in time phase opposition with the magnetism in the quadrature core, and since this current and the magnetism reverse signs together the torque due to their product and relative mechanical position will remain always of the same sign. Hence the machine operates similarly to a direct-current series motor. In short, the armature current which flows in the neighborhood of the field-poles gives to the rotor $a$ a torque the direction of which depends on the relative direction of the armature-current and the magnetic poles in much the same way as with the direct-current series motor, and due to this torque rotary motion of the rotor $a$ results. As the speed of the rotor $a$ increases the motion of its conductors through the magnetic field at N generates in said conductors an electromotive force which appears at the commutator as a counter electromotive force which weakens the effective electromotive force and therewith the armature-current, the armature-core magnetism, the field-current, and the field-core magnetism. Thus there results from increased speed of the rotor $a$ a reduced torque, just as occurs in direct-current series motors. By increasing the applied electromotive force an increase of torque can be obtained at even higher speeds, and my new motor tends to increase indefinitely the speed of its rotor as the applied electromotive force is increased or as the counter torque is decreased. There is no tendency to attain a definite limiting speed, as is found to be true with revolving field induction-motors and repulsion-motors.

The torque exerted by my motor depends upon the product of the armature-current and the magnetism at N in mechanical quadrature to the axial line of the brushes, and it may be varied in value by a change in either of these quantities. With a given armature-winding carrying a certain current the value of the torque will depend upon the quadrature field strength, which can be altered by varying the ratio of the turns on the quadrature field-cores at N to those on the field-cores in line with the brushes $b$ at M. Neglecting minor modifying effects, the value of the quadrature field magnetism will be proportional to the product of the secondary current and the number of the quadrature field-coil turns, while the load-current as it appears in the primary (or armature) will be proportional to the product of the secondary load-current and the ratio of the secondary to the primary turns. It will be appreciated, therefore, that with a certain value of load-current in the primary (or armature) the value of the quadrature magnetism depends upon only the ratio of the number of turns on the quadrature core to the secondary turns. Since, however, with a certain number of turns on the secondary of the transformer the reactance of the load-circuit in its effect upon the primary quantities varies approximately as the square of the number of turns on the quadrature field-core, it is desirable to use a low ratio of quadrature to secondary turns for high power factor of operation. The exact ratio would depend upon the service for which the machine was intended, and its value need not in general be altered for any certain motor when once constructed. The effect of lessening the relative number of turns on the quadrature cores is to decrease the torque for a given armature-current, but in general to increase the speed at which a given torque will be produced. With any given arrangement of armature and field coils the core magnetism varies approximately with the current, and hence is much decreased with increase of speed, which lessens the effective electromotive force at the commutator, as stated above. Due to the lessened core magnetism the iron loss of my new motor during operation is much less than that of any corresponding motor which retains constant core magnetism throughout its operating range. Therefore the efficiency of my new motor is greater than that of such other motor, and in general less magnetic material will be required in its construction. Again, as the speed of the armature or rotor $a$ increases the power factor of the current supplied thereto increases. This may be explained as follows: When the rotor is stationary, the apparent impedance of the motor, which limits the flow of current to the motor, has two components—viz., the power and the reactive—as will be understood by all skilled in this art. Let X represent the local reactance of the windings of the machine with its rotor stationary—that is, X is equal to the local reactance of the armature plus the relative effect of the combined reactance of the field-windings upon the armature-circuit. Similarly, let R represent the combined resistance of the rotor and the effective resistance of the field-coils $f$ and P represent a coefficient depending for its value upon the ratio of the turns upon the quadrature field-cores at N to the turns upon the brush axial field-cores at M. Then as a first approximation may the apparent impedance of the motor at any speed S be represented by the equation $$\text{apparent impedance} = Z = \sqrt{X^2 + (R + PS)^2};$$

but $$\text{current} = \frac{\text{electromotive force}}{\text{impedance}} \text{ or } I = \frac{E}{Z}$$

and $$\text{power factor} = \cos \theta = \frac{(R + PS)}{\sqrt{X^2 + (R + PS)^2}}.$$

I have found that as the speed increases the reactive component (X) of the apparent motor impedance (Z) for a certain ratio of turns on the quadrature field-cores N to those upon the brush axial field-cores M remains practically constant, while the apparent power component thereof increases practically directly with the speed due to the generated counter electromotive force of the armature which is in phase with the current supplied. This may be explained as follows: Let $\phi$ represent the flux in quadrature field-cores N cut by the rotating armature-conductors; $E_s$ represents the electromotive force generated in the armature by reason of cutting the flux $\phi$ at speed S. Then $E_s$ equals $n \phi S$, in which $n$ is a proportionality constant, and $\phi$ equals I K, in which K is a constant for condition where cores are not magnetically saturated. Hence $E_s$ equals $n$ S I K; but the increase in impedance due to the speed is equal to $$\frac{E_s}{I} = \frac{n \text{ S I K}}{I} = n \text{ K S} = \text{PS}.$$

From a consideration of these facts and of the relations expressed mathematically above the power component continually approaches in value the apparent motor impedance as the speed is increased. Hence the power factor, the ratio of the power component, $(R + PS,)$ and the apparent motor impedance, $$\sqrt{X^2 + (R + PS)^2},$$

or $$\frac{(R + PS)}{\sqrt{X^2 + (R + PS)^2}},$$

continually approaches unity and is in my new motor higher at any operating speed than that of any other alternating-current induction-motor without auxiliary devices known to me. Let rotation of the rotor in the direction produced by the electrical (its own) torque be considered positive. Then may rotation in the contrary direction (against its own torque) be considered negative. Since the power component of the motor impedance has a certain value at zero speed (or with the rotor stationary) and increases, as above explained, with increase of speed, it should follow that by driving the rotor in a negative direction the apparent power component—in this case $(R - PS)S$ being now negative—will reduce to zero and disappear. The power factor then reduces to zero, and the current supplied to the motor will represent no energy flowing either to or from the motor. This will be apparent from the relations above set forth, as well as by the relations algebraically expressed by the equation $$\text{power} = I E \cos \theta = \frac{E^2 (R - PS)}{X^2 + (R - PS)^2},$$

the negative sign being due to the direction of rotation of the rotor and the expression reducing to zero for zero value of the apparent power component, $R - PS$. A further increase of speed in the negative direction will manifestly cause the expression for the power factor and for the power to become negative, the interpretation of which is that the machine is now being operated as a generator and is hence supplying energy to the line—i. e., energy is flowing from the machine. This is not a mere theoretical deduction, but has been amply proved by me in practical tests. If then during operation as a motor at a certain speed the quadrature field flux be relatively reversed with reference to the brush axial-line field flux, so as to tend to drive the rotor in the opposite direction, not only will a braking effect be produced by such change, but also will energy be transmitted from the machine to the line. In the figure I have shown a double-pole double-throw switch by means of which the field-coils on the brush axial line and the quadrature cores M and N, respectively, may be relatively reversed.

As with direct-current series motors, a low electromotive force is preferable to a high one, and the electromotive force so applied to the commutator can be varied throughout any desired range by suitable transformers $t$, receiving current from the source of supply. Again, this variation in the electromotive force applied at the commutator provides an economical method of speed-control of the rotor in service. While the series-parallel method of control can be applied to my new motor with as good effect as to the direct-current series motor, the most economical method of control is by variation of the impressed electromotive force without the use of resistance, one method for doing which is above set forth; and in this respect my new motor is preferable to the direct-current series motor with its regulating resistance. Therefore a decided advantage in speed control results from the use of reducing-transformers permissible in the operation of my new motor. Moreover, the electromotive force applied at the commutator is most effectually varied by means of transformers and can be by them kept at the relatively low value so desirable in commutator operation. Again, since the motor or impressed electromotive force can thus be derived by transformation in my new motor the circuit electromotive force can be placed at any value suitable for transmission, and the whole transmission system becomes much simplified thereby.

I have found that the torque exerted by my new motor varies throughout its whole operating range quite closely as the square of the current value and is in this respect independent of the speed of the rotor or of the method by which current variation may be obtained in much the same way as is true with direct-current series motors.

In the operation of my new motor I consider a low frequency, while not essential, desirable on account of the increase of the power factor with the relative decrease of the reactive component of the motor impedance, as has been set forth above.

My motor is not a repulsion-motor and does not operate upon repulsion principles; but it is an induction-series motor, the field magnetism being induced by the armature-current and being proportional thereto, while the torque depends, as in direct-current series motors, upon the product of field magnetism and armature-current. The repulsion-motor is a constant-magnetism machine, and its successful operation requires in its construction a stator-core of continuous magnetic material. My machine is a variable-magnetism machine, and its performance is practically unaltered whether a continuous core or projecting poles be used on the stationary part of the structure. The high operating power factor of my machine is due to the fact that the electromotive force counter-generated by the motion of the armature-conductors through the quadrature field magnetism is in time phase and in mechanical position to decrease the armature-current and therewith the core magnetism, so that less exciting-current is required under speed conditions than at starting, and the current which does flow through the armature becomes more and more nearly in time phase with the impressed armature electromotive force with increase of speed, as has been fully set forth herein. As previously stated, the power factor at starting is governed by the ratio of the axial-line field-turns to quadrature field-turns.

In the drawing I have shown my invention as embodied in a bipolar motor having four projecting field-core sections; but it will be evident to all skilled in this art that my invention can be applied to and embodied in a motor having any number of poles and also applied to and embodied in a motor with conductors in the armature thereof which are interconnected by any of the methods now in use in direct-current machines. It will also be evident to all such persons that instead of the projecting field-core sections shown in the drawing for sake of illustration a uniformly-slotted field-core with coils so interconnected as to form definite magnetic poles when the current flows in said coils may be used. For this latter arrangement a two-phase winding with separate phases, as ordinarily applied to induction-motors, is convenient. Where desirable, the number of turns on the one winding may be made different from those on the other, the object of which arrangement has been fully set out above.

What I claim is—

1. In combination in a machine of the class described, a coil-carrying rotor provided with a commutator; brushes in contact with said commutator and connected with a suitable source of current-supply; a pair of field-magnet core-sections in the line of said brushes; a pair of field-magnet core-sections in mechanical quadrature with the line of said brushes; and field-coils surrounding both said pairs of core-sections, and interconnected and closed upon themselves.

2. In combination in a machine of the class described, a coil-carrying rotor provided with a commutator; brushes in contact with said commutator and connected with a suitable source of current-supply; said source of current-supply; field-magnet core-sections in the line of said brushes; field-magnet core-sections in mechanical quadrature with the line of said brushes; coils surrounding said field-magnet core-sections, the coils surrounding the sections in line with the brushes being connected with the coils surrounding the other sections through a reversing device, said series of coils being closed upon themselves; and said reversing device.

3. In combination in a machine of the class described, a coil-carrying rotor provided with a commutator; brushes in contact with said commutator and connected with a suitable source of current-supply; a plurality of sets of field-magnet core-sections around said rotor; a plurality of sets of coils for said sections; the number of turns in the several sets of said coils bearing a predetermined relation and the several sets being interconnected and closed upon themselves.

4. In combination in a machine of the class described, a coil-carrying rotor provided with a commutator; brushes in contact with said commutator and connected with a suitable source of current-supply; a plurality of sets of field-magnet core-sections; a plurality of sets of coils for said sections, said sets being interconnected and closed upon themselves; and means for reversing the torque upon said rotor.

5. In combination in a machine of the class described, a coil-carrying rotor provided with a commutator; brushes in contact with said commutator and connected with a suitable source of current-supply; a plurality of sets of field-magnet core-sections; a plurality of sets of coils for said sections, said sets being interconnected and closed upon themselves; and a switch in circuit with said coils.

6. In combination in a machine of the class described, a coil-carrying rotor provided with a commutator; brushes in contact with said commutator; means for varying the electromotive force impressed at said brushes; a plurality of sets of field-magnet core-sections; and a plurality of sets of coils for said sections, said coils being interconnected and closed upon themselves.

7. In combination in a machine of the class described, a coil-carrying rotor provided with a commutator; brushes in contact with said commutator and connected with a suitable source of current-supply; field-magnet core-sections in line with said brushes; field-magnet core-sections in mechanical quadrature with the line of said brushes; coils upon said core-sections, said coils being interconnected; and means for reversing the quadrature flux relatively to the brush axial-line flux.

ADDAMS S. McALLISTER.

Witnesses:
EDW. L. NICHOLS,
H. D. AYRES.